(12) United States Patent
Wu et al.

(10) Patent No.: US 7,760,298 B2
(45) Date of Patent: Jul. 20, 2010

(54) SYSTEM FOR DISPLAYING IMAGES INCLUDING A TRANSFLECTIVE LIQUID CRYSTAL DISPLAY PANEL

(75) Inventors: I-Lin Wu, Tainan (TW); Hao-Chun Lee, Taitung (TW); Ming-Wei Yu, Dajia Township, Taichung County (TW); Yao-Jen Chang, Jhunan Township, Miaoli County (TW)

(73) Assignee: TPO Displays Corp., Chu-Nan, Miao-Li County (TW)

( * ) Notice: Subject to any disclaimer, the term of this patent is extended or adjusted under 35 U.S.C. 154(b) by 180 days.

(21) Appl. No.: 12/020,145

(22) Filed: Jan. 25, 2008

(65) Prior Publication Data
US 2008/0180617 A1    Jul. 31, 2008

(30) Foreign Application Priority Data
Jan. 26, 2007   (TW) ............................... 96103265 A (51) Int. Cl.
G02F 1/1335   (2006.01)
G02F 1/1343   (2006.01)

(52) U.S. Cl. ....................................... 349/114; 349/144
(58) Field of Classification Search ................. 349/114, 349/144
See application file for complete search history.

(56) References Cited

U.S. PATENT DOCUMENTS 6,850,298 B2 *    2/2005   Fujimori et al. ............. 349/114

\* cited by examiner

*Primary Examiner*—Jerry T Rahll
(74) *Attorney, Agent, or Firm*—Morris, Manning & Martin LLP; Tim Tingkang Xia (57) ABSTRACT

A system for displaying images including a transflective liquid crystal display panel. The transflective liquid crystal display panel comprises a plurality of sub-pixels, each defined between two adjacent data lines and two adjacent scan lines. The sub-pixel comprises a transparent photoresistant layer on a color filter substrate, a reflective layer on an array substrate opposite and corresponding to the transparent photoresistant layer, a plurality of TFTs on the array substrate driving a plurality of sub-pixel areas sharing the reflective layer, and a liquid crystal layer between the color filter substrate and the array substrate.

14 Claims, 8 Drawing Sheets

SYSTEM FOR DISPLAYING IMAGES INCLUDING A TRANSFLECTIVE LIQUID CRYSTAL DISPLAY PANEL

FIELD OF THE INVENTION

The invention relates to a transflective liquid crystal display panel, and more particularly to a transflective liquid crystal display panel using a plurality of thin-film transistors to drive a sub-pixel.

DESCRIPTION OF THE RELATED ART

Recently, the liquid crystal display has been applied widely to the display element of various products such as desktop computers, televisions, digital watches, telephones, beepers, mobile phones, electronic calculators and the like. In order to allow the liquid crystal display to have wider viewing angles, an in-plane switching liquid crystal display (IPS LCD) and a multi-domain vertical alignment liquid crystal display (MVA LCD) have been developed. Although these types of liquid crystal displays can improve viewing angles, a problem of color washout is produced at the wider viewing angles.

Figure 1:
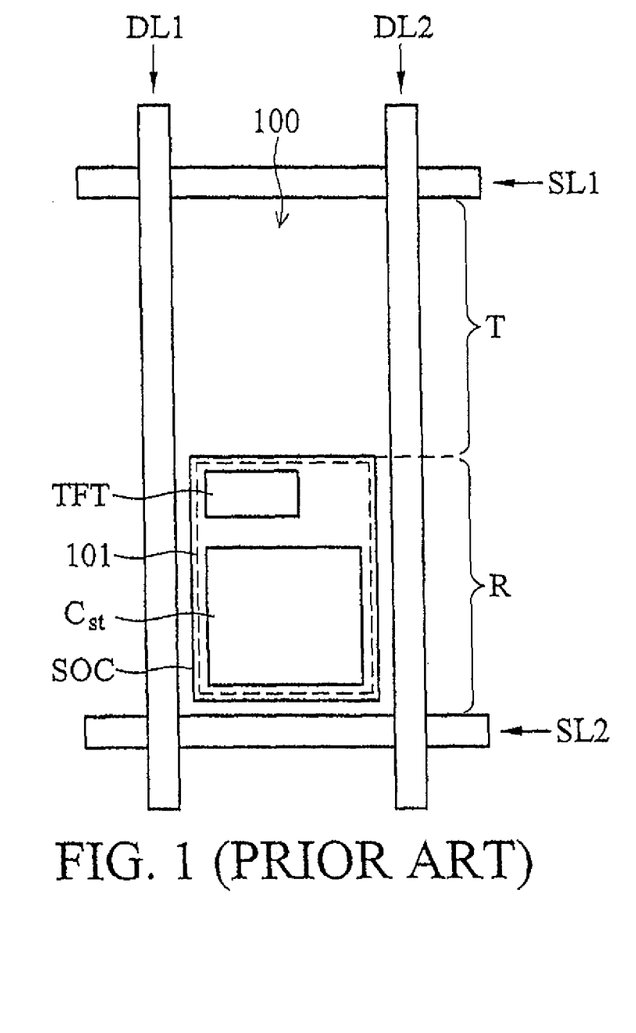
FIG. 1 is a schematic plane view of a sub-pixel of a conventional transflective liquid crystal display panel.

In general, a liquid crystal display panel has a plurality of sub-pixel areas. Referring to FIG. 1, a plane view of a sub-pixel 100 of a conventional transflective liquid crystal display panel is shown. The sub-pixel 100 is defined between two adjacent data lines DL1, DL2 and two adjacent scan lines SL1, SL2, which has a reflective area R and a transparent area T. The sub-pixel 100 is driven by one thin-film transistor (TFT), and the TFT is disposed on an array substrate (not shown) of the reflective area R. A transparent photoresistant layer, i.e., a step on color filter (SOC) is disposed on a color filter substrate (not shown) at the reflective area R. A storage capacitor Cst and a reflective layer 101 are disposed on the array substrate.

Figure 2:
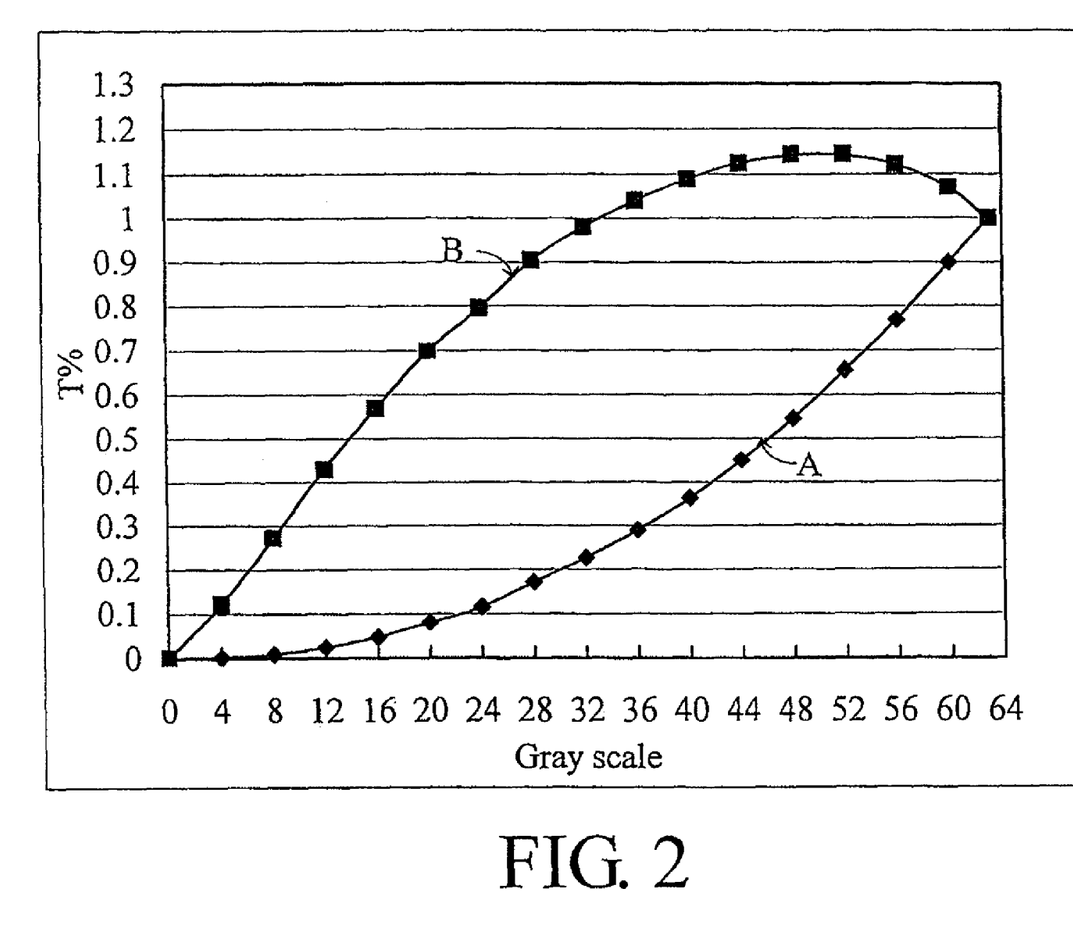
FIG. 2 shows a gamma 2.2 curve A and a gamma curve B at a view angle of 60 degrees of a conventional transflective liquid crystal display.

A gamma curve is a curve of brightness (transmission) versus gray level of a liquid crystal display at different gray levels. The color washout phenomenon is reduced when the gamma curve is close to a gamma 2.2 curve. In a conventional transflective liquid crystal display, because the optical path is changed when the viewing angle increases, the voltage versus transmission curve (V-T curve) thereof is changed with the increased viewing angle. Referring to FIG. 2, the line A is the gamma 2.2 curve, and the line B is a gamma curve of the conventional transflective liquid crystal display at a viewing angle of 60 degrees, i.e., an oblique view angle diverged from a normal view angle with 60 degrees. As shown in FIG. 2, the gamma curve of the conventional transflective liquid crystal display at a view angle of 60 degrees is significantly diverged from the gamma 2.2 curve and color washout is produced, thus worsening the display quality of the conventional transflective liquid crystal display.

Therefore, a liquid crystal display panel that not only achieves wider viewing angles but also overcomes the color washout at the wider viewing angles is desirable to achieve better display quality.

BRIEF SUMMARY OF THE INVENTION

The invention utilizes a plurality of thin-film transistors to drive a single sub-pixel of a transflective liquid crystal display panel, such that the display panel exhibits a gamma curve closer to an ideal gamma curve than the conventional transflective liquid crystal display panel at wide viewing angles and to overcome color washout thereof.

The invention provides a system for displaying images. An exemplary embodiment of such as system comprises a transflective liquid crystal display panel, wherein the transflective liquid crystal display panel has a plurality of sub-pixels, each sub-pixel is defined between two adjacent data lines and two adjacent scan lines. The sub-pixel comprises a color filter substrate and a transparent photoresistant layer disposed on the color filter substrate. An array substrate is disposed opposite to the color filter substrate. A reflective layer is disposed over the array substrate and corresponds to the transparent photoresistant layer. A plurality of thin-film transistors are disposed on the array substrate for driving a plurality of areas of the sub-pixel respectively, wherein at least one first thin-film transistor is disposed under the reflective layer. A liquid crystal layer is disposed between the color filter substrate and the array substrate An exemplary transflective liquid crystal display panel of the invention selects the combinations of driving voltages of the thin-film transistors constant voltage to obtain a gamma curve close to an ideal gamma curve at viewing angles larger than 60 degrees, such that the color washout at wide viewing angles can be reduced.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

In order to achieve a wider viewing angle range, i.e., view angles larger than 60 degrees, and have a better contrast both at a normal viewing angle and a wider viewing angle, a transflective liquid crystal display panel of the invention prefers a multi-domain vertical alignment (MVA) liquid crystal display panel. However, the MVA liquid crystal display panel has more color washout than an in-plane switching (IPS) liquid crystal display panel at wider viewing angles. As such, the invention utilizes the combinations of driving voltages of a plurality of thin-film transistors to control a plurality of areas of a single sub-pixel, such that the transflective liquid crystal display panel exhibits a gamma curve close to an ideal gamma curve at wider viewing angles and the color washout is reduced. The ideal gamma curve such as a gamma 2.2 curve, a gamma 1.8 curve or the other curves, is dependent on the actual requirement of the display. In the embodiments described below, the examples use the gamma 2.2 curve as the ideal gamma curve.

Among the plurality of thin-film transistors, there is only one thin-film transistor at a reflective area of the sub-pixel and disposed under a reflective layer. Moreover, the plurality of thin-film transistors have storage capacitors disposed under the reflective layer together. Therefore, the aperture ratio of the transflective liquid crystal display panel of the invention is equivalent to that of the conventional transflective liquid crystal display panel which utilizes a single thin-film transistor to control a single sub-pixel. Although there are more than one thin-film transistors in a single sub-pixel, the aperture ratio of the display panel of the invention is not reduced.

In the transflective liquid crystal display panel of the invention, a plurality of areas of the sub-pixel are preferred divided into each area sharing the same reflective layer, and each thin-film transistor has the storage capacitor disposed under the reflective layer. For example, the sub-pixel is divided into two to four portions, and the reflective layer and the storage capacitor of each thin-film transistor are aligned to a central area of the sub-pixel. Therefore, the aperture ratio of the transflective liquid crystal display panel of the invention is approximately equal to that of the conventional transflective liquid crystal display panel with single thin-film transistor in one sub-pixel.

Figure 3:
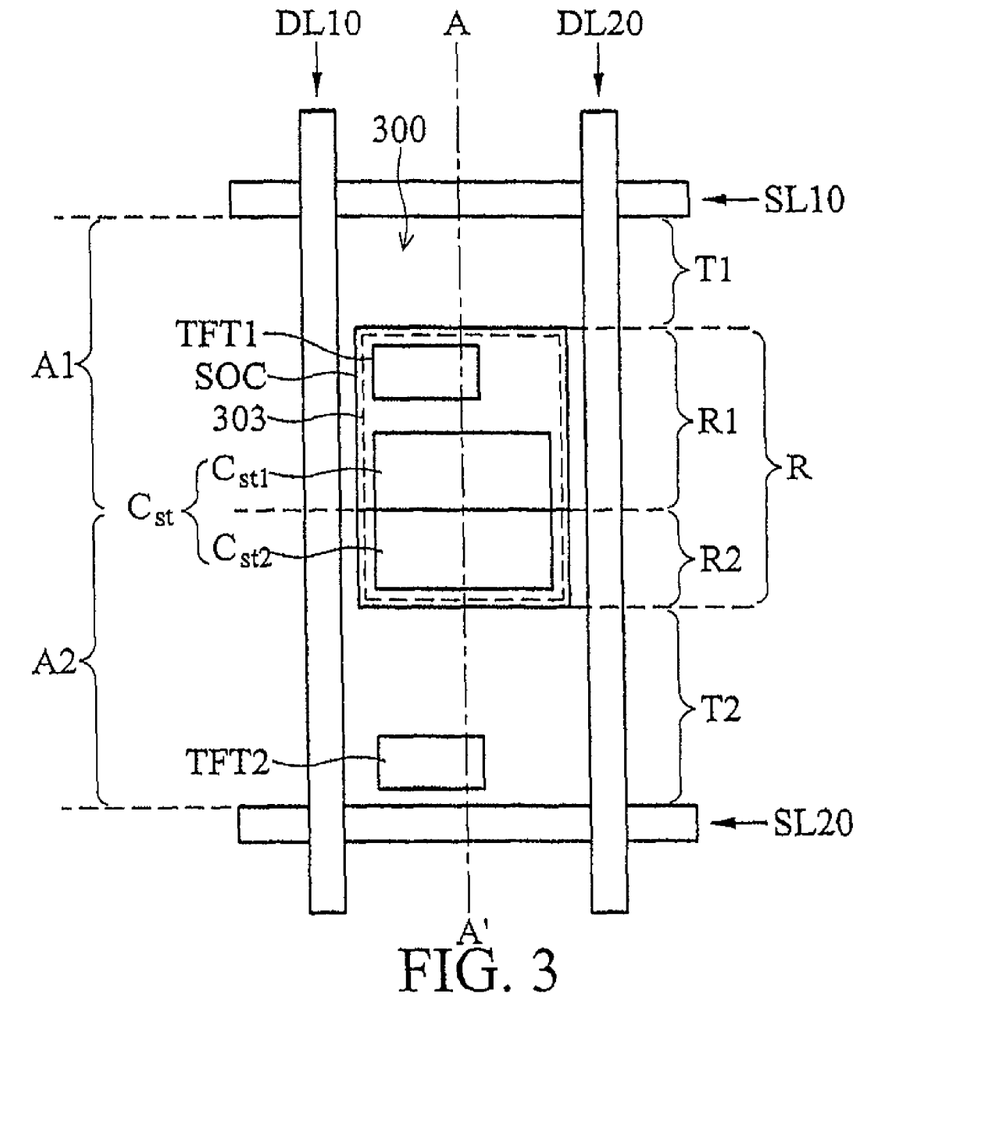
FIG. 3 is a schematic plane view of a sub-pixel of a transflective liquid crystal display panel according to an embodiment of the invention.

Referring to FIG. 3, a schematic plane view of a sub-pixel 300 of a transflective liquid crystal display panel is shown according to an embodiment of the invention. The sub-pixel 300 is defined between two adjacent data lines DL10, DL20 and two adjacent scan lines SL10, SL20. The sub-pixel may be divided into two or more than two areas, and each area has a thin-film transistor therein. As shown in FIG. 3, for example, the sub-pixel 300 is divided into two areas A1 and A2. The areas A1 and A2 have thin-film transistors TFT1 and TFT2 respectively. The area ratio of the area A1 to the area A2 may be 1:1 to 1:3, and the preferred ratio is 1:1.6. The areas A1 and A2 are driven by the thin-film transistors TFT1 and TFT2 respectively.

The two areas A1 and A2 divided from the sub-pixel 300 have a reflective area R1 and a reflective area R2 respectively, wherein the two reflective areas R1 and R2 share the same reflective layer 303. The reflective layer 303 is aligned to a transparent photoresistant layer on a color filter, i.e., step on color filter SOC. The thin-film transistors TFT1 and TFT2 of the areas A1 and A2 have storage capacitors Cst1 and Cst2 respectively, and the storage capacitors Cst1 and Cst2 are gathered to form a storage capacitor Cst aligned to the area of the reflective layer 303. As shown in FIG. 3, the sub-pixel 300 includes a reflective area R comprising two reflective areas R1 and R2, and two transparent areas T1 and T2. The reflective area R is the area occupied by the step on color filter SOC. Because the two areas of the sub-pixel share the same reflective layer and the storage capacitor of the two thin-film transistors is aligned to the reflective layer, the aperture ratio of the display panel of the invention is approximately equal to that of the sub-pixel 100 (as shown in FIG. 1) of the conventional transflective liquid crystal display panel.

Figure 4:
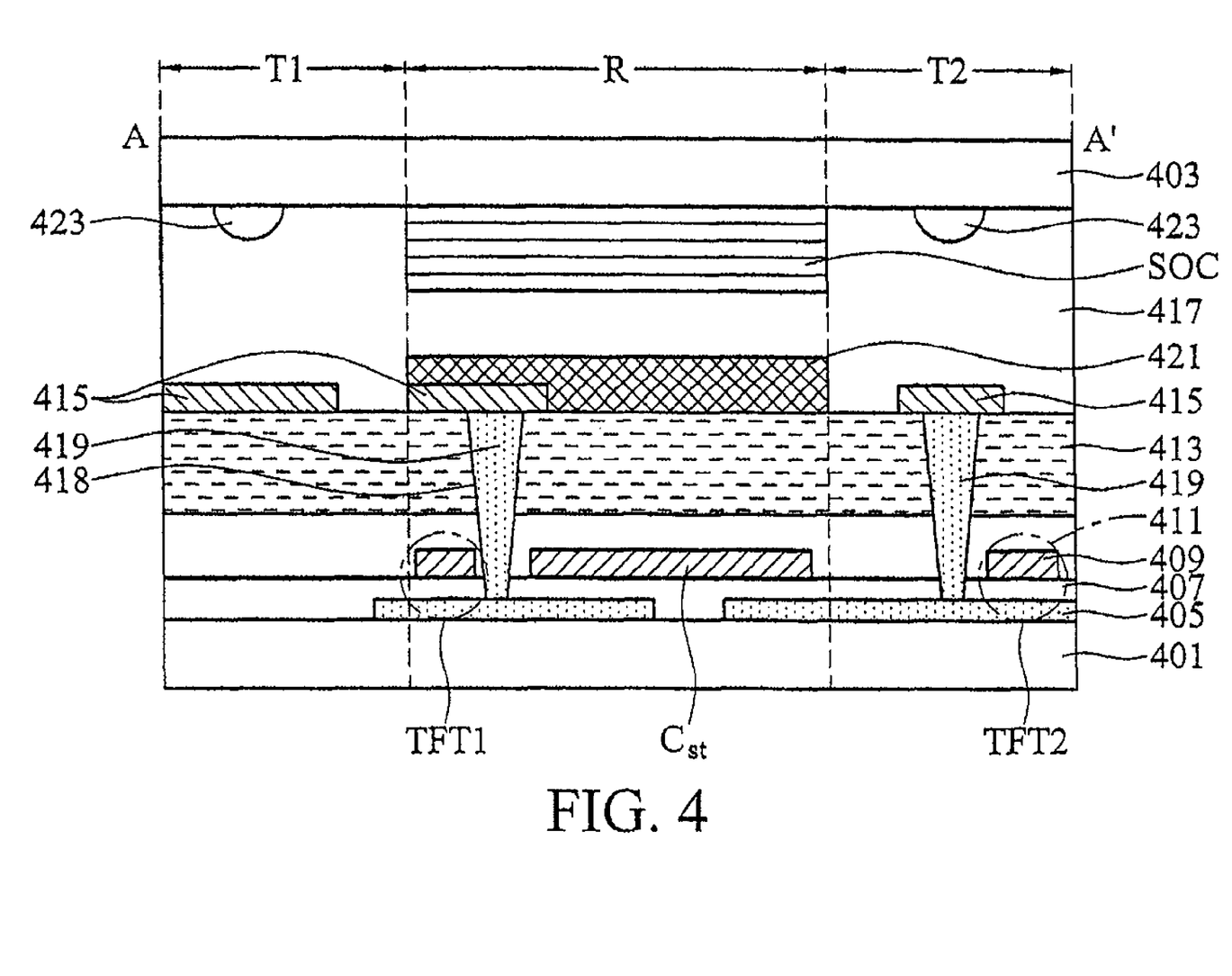
FIG. 4 is a schematic cross section of the transflective liquid crystal display panel along the dotted line A-A' of FIG. 3.

FIG. 4 is a schematic cross section of the display panel along the dotted line A-A' of FIG. 3, which comprises an array substrate 401 and a color filter substrate 403 sandwiching a liquid crystal layer 417. A polysilicon layer 405 is disposed on the array substrate 401 as an active layer of the thin-film transistors TFT1 and TFT2. The polysilicon layer 405 is covered with a gate insulating layer 407. A gate 409 and the storage capacitor Cst are formed on the gate insulating layer 407. Then, an interlayer dielectric layer 411 and a planarization layer 413 are formed on the gate 409 and the storage capacitor Cst in sequence. A via 418 is formed through the planarization layer 413, the interlayer dielectric layer 411 and the gate insulating layer 407, and a conductive material such as Al or Mo is filled in the via 418 to form a plug 419, such that the thin-film transistors TFT1, TFT2 and a pixel electrode 415 on the planarization layer 413 are electrically connected. The pixel electrode 415 may be formed from a transparent conductive material such as ITO, IZO or the likes. A reflective layer 421 is disposed on the planarization layer 413, and the material thereof is such as Al. The reflective layer 421 is aligned to the transparent photoresistant layer SOC on the color filter substrate 403. A plurality of protrusions 423 may be disposed on the color filter substrate 403, which are used to divide the liquid crystal molecules into a plurality of areas in the MVA liquid crystal display panel. As shown in FIG. 4, the storage capacitor Cst of the thin-film transistors TFT1 and TFT2 is aligned to the reflective layer 421, and the reflective layer is aligned to the transparent photoresistant layer SOC on the color filter substrate 403. These components consist of the reflective area R of the transflective liquid crystal display panel. Two transparent areas T1 and T2 are respectively disposed at both sides of the reflective area R.

Figure 5:
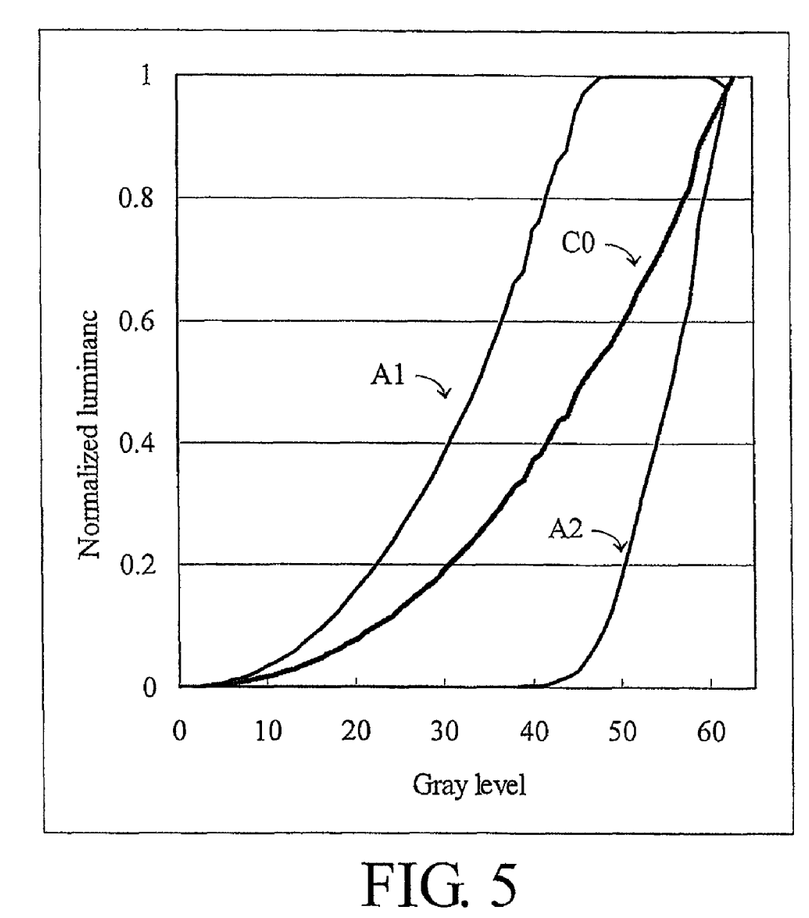
FIG. 5 shows a gamma curve A1 of the area A1, a gamma curve A2 of the area A2, and a combinatorial gamma curve C0 thereof according to the sub-pixel of FIG. 3 at a view angle of 0 degrees.

Referring to FIG. 5, which shows gamma curves of the two areas A1 and A2 of the sub-pixel 300 and a combinatorial gamma curve thereof at a viewing angle of 0 degrees, i.e., a normal viewing angle perpendicular to the display plane. In the FIG. 5, the line A1 is the gamma curve of the area A1, the line A2 is the gamma curve of the area A2, and the line C0 is the gamma curve of the sub-pixel 300. Comparing the line C0 of FIG. 5 with the line A of gamma 2.2 curve of FIG. 2, the gamma curve of the transflective liquid crystal display panel of the invention at the normal viewing angle satisfies the gamma 2.2 curve, such that the display panel of the invention at the viewing angle of 0 degrees has no color washout.

Figure 6:
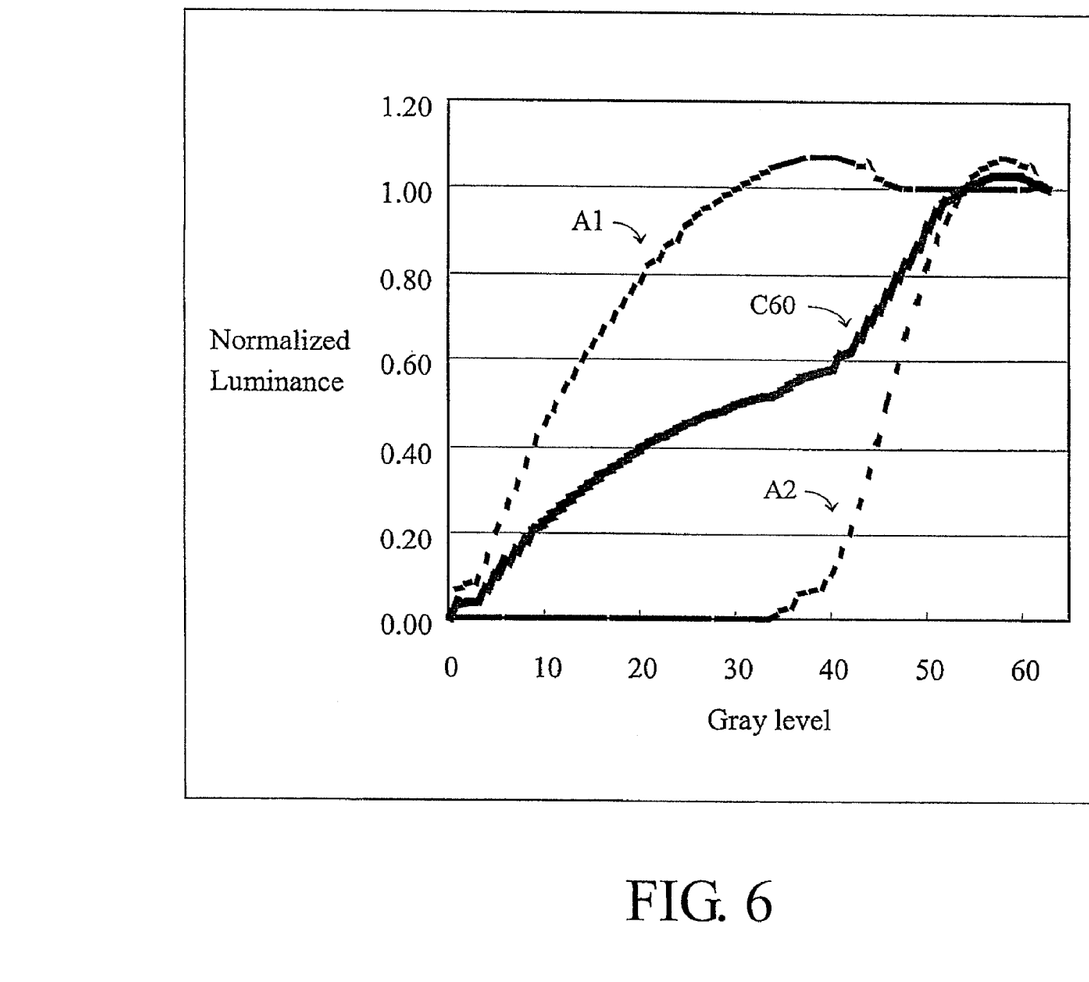
FIG. 6 shows a gamma curve A1 of the area A1, a gamma curve A2 of the area A2, and a combinatorial gamma curve C60 thereof according to the sub-pixel of FIG. 3 at a view angle of 60 degrees.

Referring to FIG. 6, which shows gamma curves of the two areas A1 and A2 of the sub-pixel 300 and a combinatorial gamma curve thereof at a viewing angle of 60 degrees. In FIG. 6, the line A1 is the gamma curve of the area A1, the line A2 is the gamma curve of the area A2, and the line C60 is the gamma curve of the sub-pixel 300.

Figure 7:
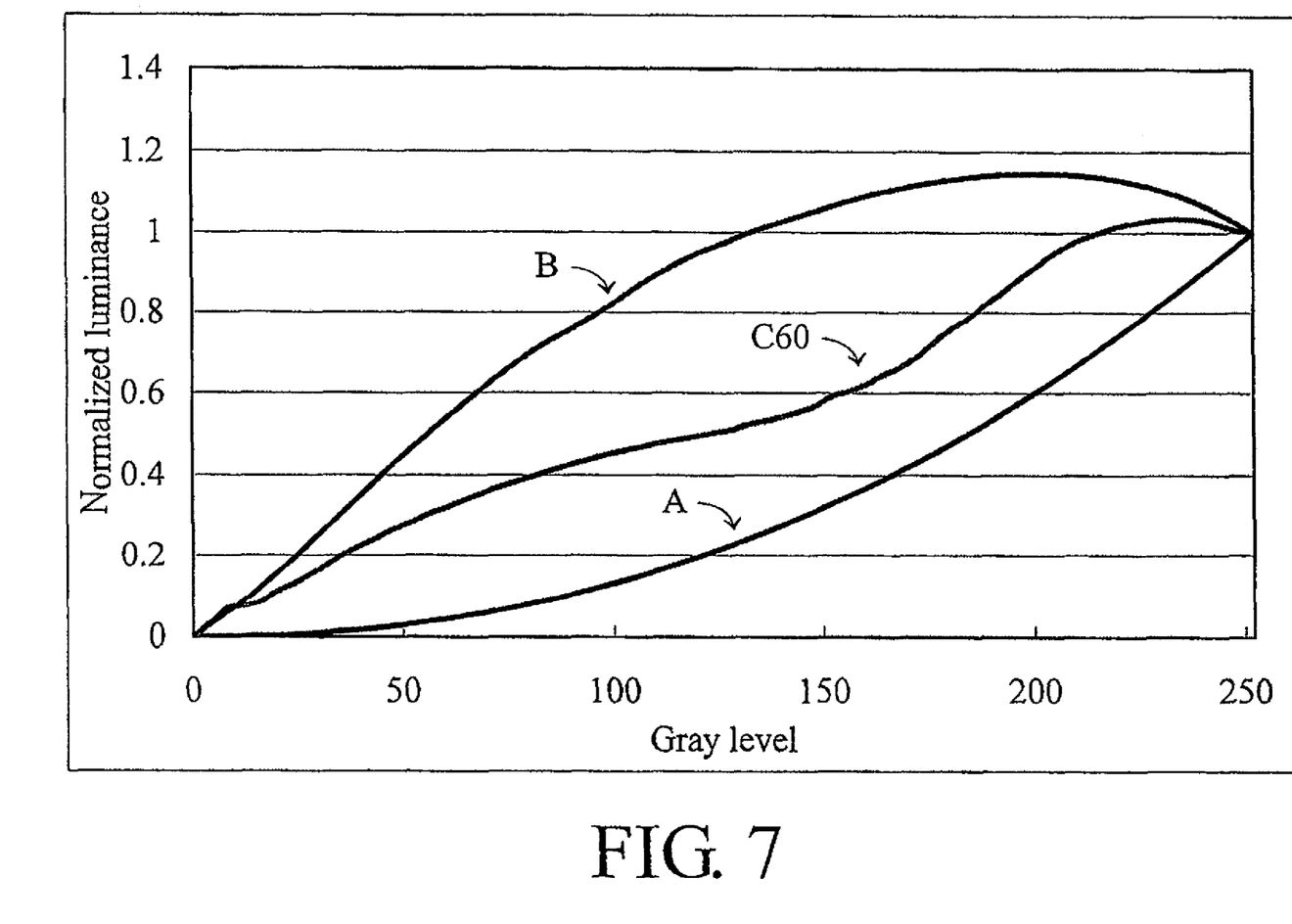
FIG. 7 shows the gamma curve C60 of FIG. 6 compared with the gamma curve B and the gamma 2.2 curve A of FIG. 2.

Referring to FIG. 7, which shows the gamma curve C60 of FIG. 6 comparing the gamma curve B and the gamma 2.2 curve A of FIG. 2. The gamma curve B is obtained from the conventional transflective liquid crystal display at the viewing angle of 60 degrees, wherein a single sub-pixel thereof has one thin-film transistor. As shown in FIG. 7, the gamma curve C60 of the transflective liquid crystal display panel of the invention at the viewing angle of 60 degrees is closer to the gamma 2.2 curve than the gamma curve B of the conventional transflective liquid crystal display at the viewing angle of 60 degrees, such that the display panel of the invention at wider viewing angles has lighter color washout than the conventional transflective liquid crystal display.

The gamma curve C60 of FIG. 6 is an example of one exemplary combination of driving voltages of the thin-film transistors of the two areas A1 and A2. The combinations of driving voltages are obtained from the preferred combinations calculated by computer. Meanwhile, other combinations of driving voltages can also be used to form the gamma curves, and the combinations are not limited to a certain combination of driving voltages. The gamma curve is better when it is formed closer to the gamma 2.2 curve, such that color washout thereof is reduced. The plurality of thin-film transistors of the sub-pixel may have the same voltage versus transmission curve (V-T curve), i.e., use one kind of V-T curve but a plurality of gamma curves to form a combinatorial gamma curve close to gamma 2.2 curve. Additionally, the plurality of thin-film transistors of the sub-pixel may have different V-T curves to form a combinatorial gamma curve close to gamma 2.2 curve. Both of the above combination methods can make the transflective liquid crystal display panel of the invention achieve reduced color washout at wider viewing angles.

Compared with the conventional transflective liquid crystal display panel, the single sub-pixel area of the display panel of the invention is divided into a plurality of areas, and a plurality of thin-film transistors are used to drive the plurality of areas of the sub-pixel respectively. Therefore, a gamma curve close to gamma 2.2 curve at wider viewing angles can be obtained by the combinations of various driving voltages of the thin-film transistors, and then the color washout of the transflective MVA liquid crystal display panel at wider viewing angles can be reduced.

In order to complete the fabrication of the liquid crystal display, one skilled in the art can appreciate that according to the conventional method, a pair of polarizers also sandwich the transflective liquid crystal display panel and a backlight device disposed under the lower polarizer.

The above is illustrated with the transflective MVA LCD as an example, but it is not limited to, the liquid crystal display panel of the invention can also be used in other types of transflective LCDs.

Figure 8:
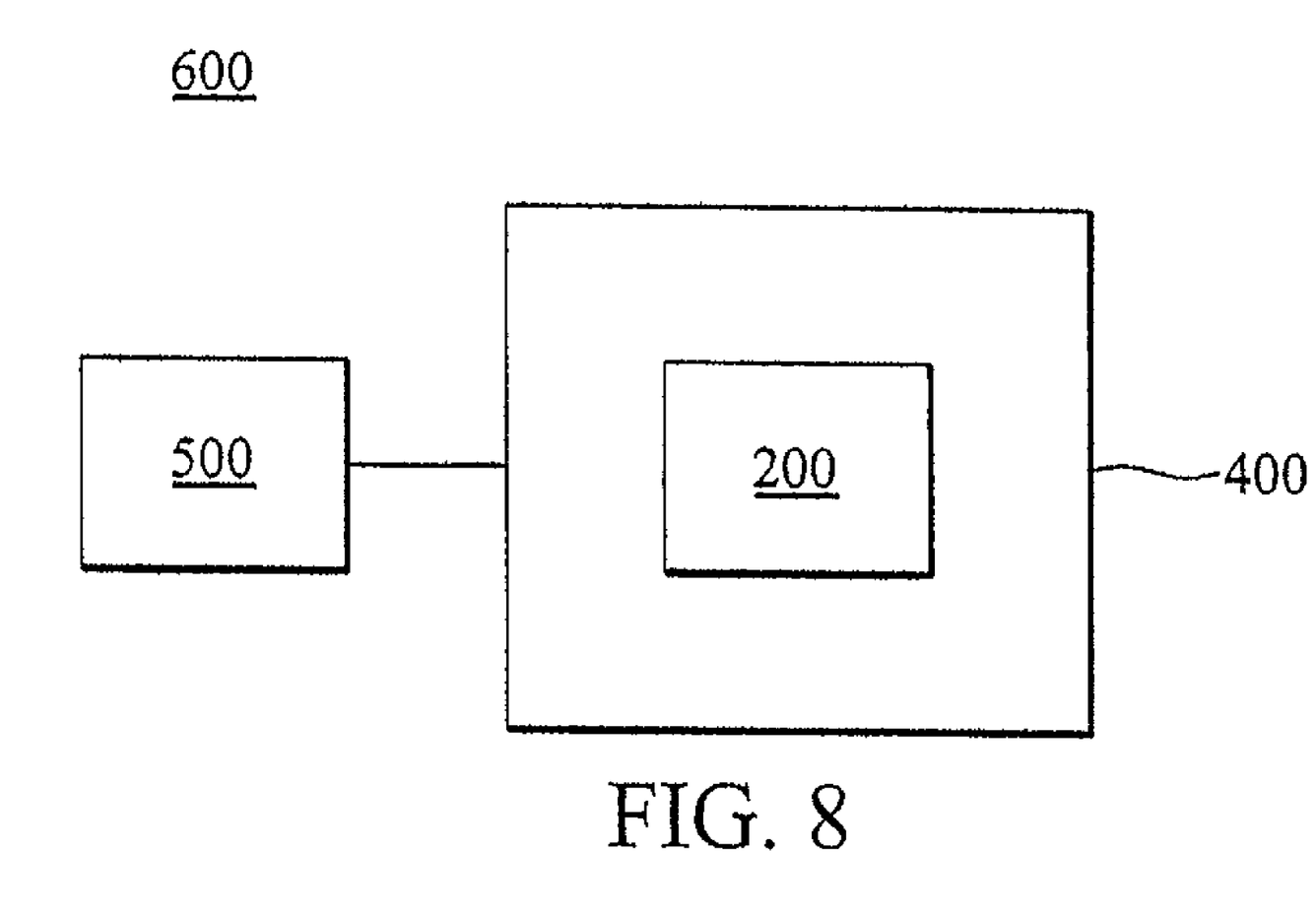
FIG. 8 schematically shows a system for displaying images including the transflective liquid crystal display panel according to an embodiment of the invention.

Referring to FIG. 8, shows a system 600 for displaying images including the transflective liquid crystal display panel according to an embodiment of the invention. The system comprises a liquid crystal display 400, and the liquid crystal display comprises the transflective liquid crystal display panel 200, a pair of polarizers sandwiching the transflective liquid crystal display panel 200, and a backlight device disposed under the lower polarizer. The liquid crystal display 400 can be a part of an electronic device. In general, the system 600 for displaying images comprises the liquid crystal display 400 and an input unit 500. The input unit 500 is coupled to the liquid crystal display 400 and operative to provide input to the liquid crystal display such that the liquid crystal display displays images. The system 600 for displaying images can be a mobile phone, digital camera, personal data assistant (PDA), notebook computer, desktop computer, television, car display or portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
 a transflective liquid crystal display panel, wherein the transflective liquid crystal display panel has a plurality of sub-pixels, each sub-pixel is defined between two adjacent data lines and two adjacent scan lines, and the sub-pixel comprises:
 a color filter substrate;
 a transparent photoresistant layer disposed on the color filter substrate;
 an array substrate disposed opposite to the color filter substrate;
 a reflective layer disposed over the array substrate and corresponding to the transparent photoresistant layer;
 a plurality of thin-film transistors disposed on the array substrate for driving a plurality of areas of the sub-pixel respectively, wherein at least one first thin-film transistor is disposed under the reflective layer;
 a storage capacitor disposed on the array substrate under the reflective layer, wherein the thin-film transistors share the storage capacitor; and
 a liquid crystal layer disposed between the color filter substrate and the array substrate.

2. The system as claimed in claim 1, wherein the reflective layer and the storage capacitor are substantially aligned to a central area of the sub-pixel.

3. The system as claimed in claim 1, wherein each area of the sub-pixel includes a transparent area and a reflective area.

4. The system as claimed in claim 1, wherein the thin-film transistor simultaneously drives a transparent area and a reflective area.

5. The system as claimed in claim 1, wherein the sub-pixel has a plurality of transparent areas and a plurality of reflective areas.

6. The system as claimed in claim 5, further comprising a second thin-film transistor disposed at the transparent area.

7. The system as claimed in claim 1, wherein the thin-film transistors have the same voltage versus transmission curve (V-T curve).

8. The system as claimed in claim 1, wherein the thin-film transistors have different voltage versus transmission curves.

9. The system as claimed in claim 1, wherein the sub-pixel is divided into a first area and a second area.

10. The system as claimed in claim 9, wherein the area ratio of the first area to the second area is 1:1 to 1:3.

11. The system as claimed in claim 1, further comprising a transflective liquid crystal display, wherein the transflective liquid crystal display comprises:
 the transflective liquid crystal display panel;
 a pair of polarizers sandwiching the transflective liquid crystal display panel; and
 a backlight device disposed under the pair of polarizers and the transflective liquid crystal display panel.

12. The system as claimed in claim 11, wherein the transflective liquid crystal display is a multi-domain vertical alignment liquid crystal display (MVA LCD).

13. The system as claimed in claim 11, further comprising an electronic device, wherein the electronic device comprises:
 the transflective liquid crystal display; and
 an input unit coupled to the transflective liquid crystal display to provide input to the transflective liquid crystal display such that the transflective liquid crystal display displays images.

14. The system as claimed in claim 13, wherein the electronic device is a mobile phone, digital camera, personal data assistant (PDA), notebook computer, desktop computer, television, car display or portable DVD player.

* * * * *